US012639663B2

(12) United States Patent
Muthu et al.

(10) Patent No.: US 12,639,663 B2
(45) Date of Patent: May 26, 2026

(54) INTEGRATED REVIEW, INVENTORY, AND COMMUNICATION AUTOMATION SYSTEMS AND METHODS

(71) Applicant: INTUIT INC., Mountain View, CA (US)

(72) Inventors: Malathy Muthu, Mountain View, CA (US); Corinne L. Finegan, Mountain View, CA (US); Alexis Kim Tymofiev, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 124 days.

(21) Appl. No.: 18/391,639

(22) Filed: Dec. 20, 2023

(65) Prior Publication Data

US 2025/0209416 A1      Jun. 26, 2025

(51) Int. Cl.
G06Q 10/087       (2023.01)
G06Q 10/40       (2026.01)
G06Q 30/0282       (2023.01)

(52) U.S. Cl.
CPC ........... G06Q 10/087 (2013.01); G06Q 10/40 (2026.01); G06Q 30/0282 (2013.01)

(58) Field of Classification Search
CPC .............................. G06Q 10/087; G06Q 10/40
USPC .......................................................... 705/28
See application file for complete search history.

(56) References Cited

U.S. PATENT DOCUMENTS

| | | | |
|---|---|---|---|
| 11,010,719 B1 * | 5/2021 | Byon ............... | G06Q 10/06316 |
| 11,809,688 B1 * | 11/2023 | Parasnis .............. | G06F 3/04845 |
| 2013/0138533 A1 * | 5/2013 | Vartanian ............... | G06Q 30/06 |
| | | | 705/26.35 |
| 2016/0350787 A1 * | 12/2016 | Taylor .................. | G06Q 10/087 |
| 2019/0244436 A1 * | 8/2019 | Stansell ............. | G06Q 30/0643 |
| 2023/0110941 A1 * | 4/2023 | Makhija ................ | G06F 40/284 |
| | | | 709/224 |

FOREIGN PATENT DOCUMENTS

| | | | | |
|---|---|---|---|---|
| KR | 2613621 B1 * | 12/2023 | | |
| WO | WO-2018013806 A1 * | 1/2018 | ........ | G06Q 10/0633 |

* cited by examiner

*Primary Examiner* — Luna Champagne
(74) *Attorney, Agent, or Firm* — DLA PIPER LLP US

(57)       ABSTRACT

At least one processor may receive a plurality of review comments, identify at least a subset of the plurality of review comments representing at least one positive review, and identify at least one product indicated by the at least one positive review. The at least one processor may determine, from data produced by an inventory system, that the at least one product has a low inventory level. In response to the determining, the at least one processor may generate a message configured to automatically order the at least one product from a supplier system and send the message to the supplier system, thereby automatically ordering the at least one product.

13 Claims, 5 Drawing Sheets

200

300

400

INTEGRATED REVIEW, INVENTORY, AND COMMUNICATION AUTOMATION SYSTEMS AND METHODS

BACKGROUND

Customer service platforms can combine, streamline, and/or automate customer service tasks in a computing environment. For example, customer service platforms can enable businesses to provide customer support across multiple digital communication channels, such as email, messaging, web portals, chat, and social media. In some cases, customer service platforms can integrate with social media networks to gather customer comments or inquiries and/or post information or directly respond to social media messages. However, the extent to which existing customer service platforms are integrated with social media networks on the one hand, and internal business systems on the other hand, is very limited.

BRIEF DESCRIPTIONS OF THE DRAWINGS

DETAILED DESCRIPTION OF SEVERAL EMBODIMENTS

Embodiments described herein may provide automated systems and methods that can integrate product reviews from various marketing channels into a single pipeline. Disclosed embodiments can manage inventory, coordinate with suppliers, create promotions, and/or interact with customers. Some embodiments can use generative artificial intelligence (GenAI) and/or natural language processing (NLP) models to analyze reviews, track inventory issues, and/or provide marketing suggestions. Some embodiments can automate order placement and restocking based on positive reviews. Some embodiments may provide for human-in-loop feedback for workflow approval. The comprehensive approach of the embodiments described herein can streamline the review management process, reduce manual workload, and provide actionable insights for business growth. Moreover, the embodiments described herein add new technical features to customer service platforms and enable the technical integration of customer service platforms with other computing systems such as social media systems and/or inventory management systems.

Figure 1:
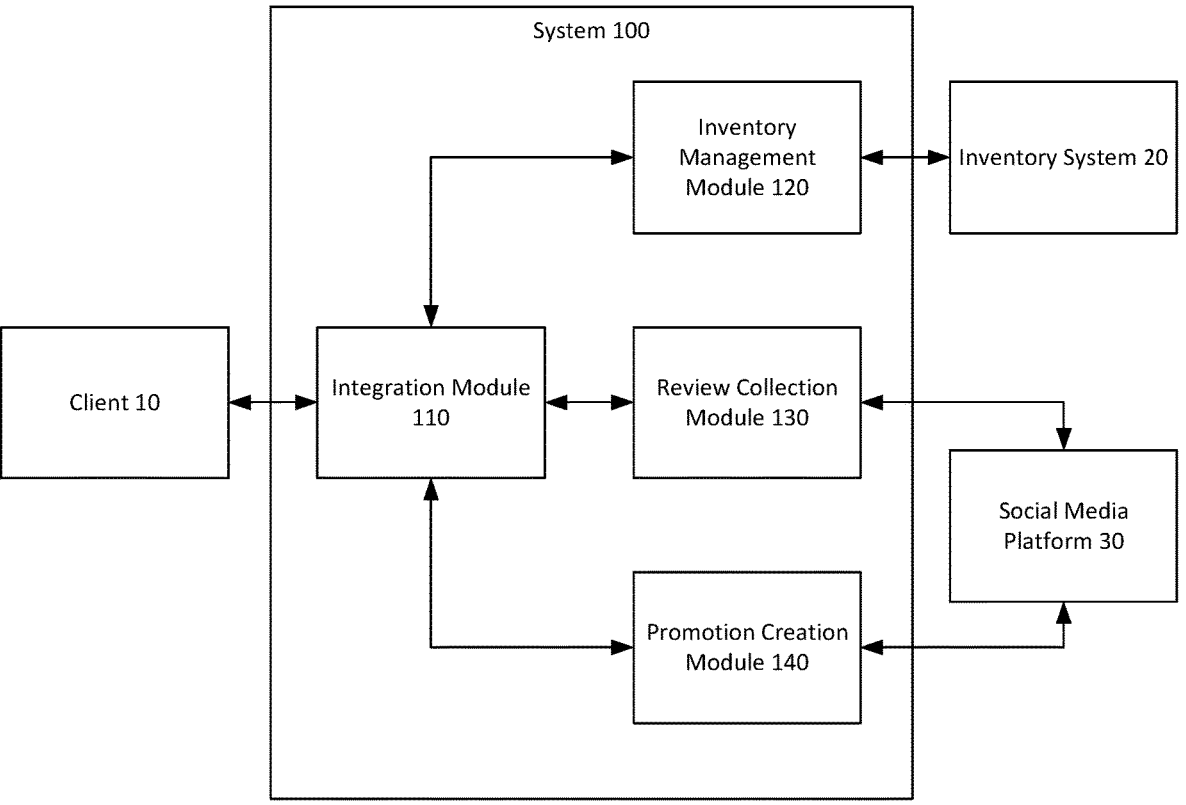
FIG. 1 shows an example customer service system according to some embodiments of the disclosure.

FIG. 1 shows an example customer service system 100 according to some embodiments of the disclosure. System 100 may include integration module 110, inventory management module 120, review collection module 130, and/or promotion creation module 140. In some embodiments, system 100 may include additional modules (not shown) that are commonly included in customer service platforms and/or other modules. As described in detail below, system 100, using the illustrated modules, may interact with client 10, inventory system 20, and/or social media platform 30. Illustrated components may include a variety of hardware, firmware, and/or software components that interact with one another. Some components shown in FIG. 1 may communicate with one another using networks. For example, client 10 may access system 100 (e.g., integration module 110) through one or more networks (e.g., the Internet, an intranet, and/or one or more networks that provide a cloud environment). In another example, inventory management module 120 may use the one or more networks to obtain data from inventory system 20. In another example, review collection module 130 and/or promotion creation module 140 may use the one or more networks to obtain data from and/or post data to social media platform 30. Each component may be implemented by one or more computers (e.g., as described below with respect to FIG. 5).

The elements of system 100 are described in greater detail below with respect to FIGS. 2-4, but in general, review collection module 130 may use extract, transform, and load (ETL) and/or extract, load, and transform (ELT) data pipelines and application programming interface (API) integration techniques to collect product reviews from various marketing channels (e.g., social media platform 30 as shown, although other data sources may be possible in addition to, or instead of, social media data sources). Review collection module 130 may use data integration methods to consolidate these reviews into a single, unified data pipeline. Inventory management module 120 can use machine learning (ML) algorithms to analyze product reviews and predict inventory demand.

Inventory management module 120 can use API integration to coordinate with suppliers and address any issues identified in the reviews, ensuring a seamless supply chain operation. Inventory management module 120 can use predictive analytics based on positive reviews to automatically place orders and restock items (e.g., through inventory system 20). Inventory management module 120 can use API integration to communicate with inventory system 20 and place orders as needed.

Promotion creation module 140 can use NLP techniques to extract positive sentiments from reviews. Promotion creation module 140 can use these sentiments to create promotional content and automatically post the content on social media platform 30 using API integration. Integration module 110 can provide a user interface (UI) and/or central control for system 100. For example, integration module 110 may use GenAI and NLP techniques to create an interactive chatbot interface. The chatbot can interact with users (e.g., users logged into system 100 through client 10), providing real-time responses to queries and concerns.

Integration module 110 can integrate with all the above modules, acting as a central hub for accessing and controlling the functionalities of system 100. Integration module 110 can use GenAI and/or NLP models to analyze reviews, track inventory issues, and provide marketing suggestions. Integration module 110 can use ML algorithms to derive actionable insights from customer feedback. For instance, integration module 110 can provide updates on inventory levels, share promotional content, respond to customer reviews, provide shipping updates, place orders, provide competitor analysis, and/or facilitate human-in-loop feedback. The chatbot can use ML algorithms to continuously learn and improve from interactions, providing more accurate and helpful responses over time. Integration module 110 can use API integration to connect with the other modules and to interface with users across various platforms. Each of these modules may be designed to work in a sequential manner, providing a comprehensive, automated solution for managing product reviews and related operations.

Elements illustrated in FIG. 1 (e.g., system 100 (including integration module 110, inventory management module 120, review collection module 130, and/or promotion creation module 140), client 10, inventory system 20, and/or social media platform 30) are each depicted as single blocks for ease of illustration, but those of ordinary skill in the art will appreciate that these may be embodied in different forms for different implementations. For example, while separate modules of system 100 are depicted separately, any combination of these elements may be part of a combined hardware, firmware, and/or software element. Moreover, while the modules are depicted as parts of a single system 100 element, any combination of these elements may be distributed among multiple logical and/or physical locations. Also, while one client 10, one inventory system 20, one social media platform 30, one system 100, one self-service portal 130, and one of each module (e.g., integration module 110, inventory management module 120, review collection module 130, and/or promotion creation module 140) are illustrated, this is for clarity only, and multiples of any of the above elements may be present. In practice, there may be single instances or multiples of any of the illustrated elements, and/or these elements may be combined or co-located. For example, system 100 may interact with multiple clients 10, multiple inventory systems 20, and/or multiple social media platforms 30.

In the following descriptions of how the illustrated components function, several examples are presented, including examples using specific data or data types. However, those of ordinary skill in the art will appreciate that these examples are merely for illustration, and the disclosed embodiments are extendable to other application and data contexts.

Figure 2:
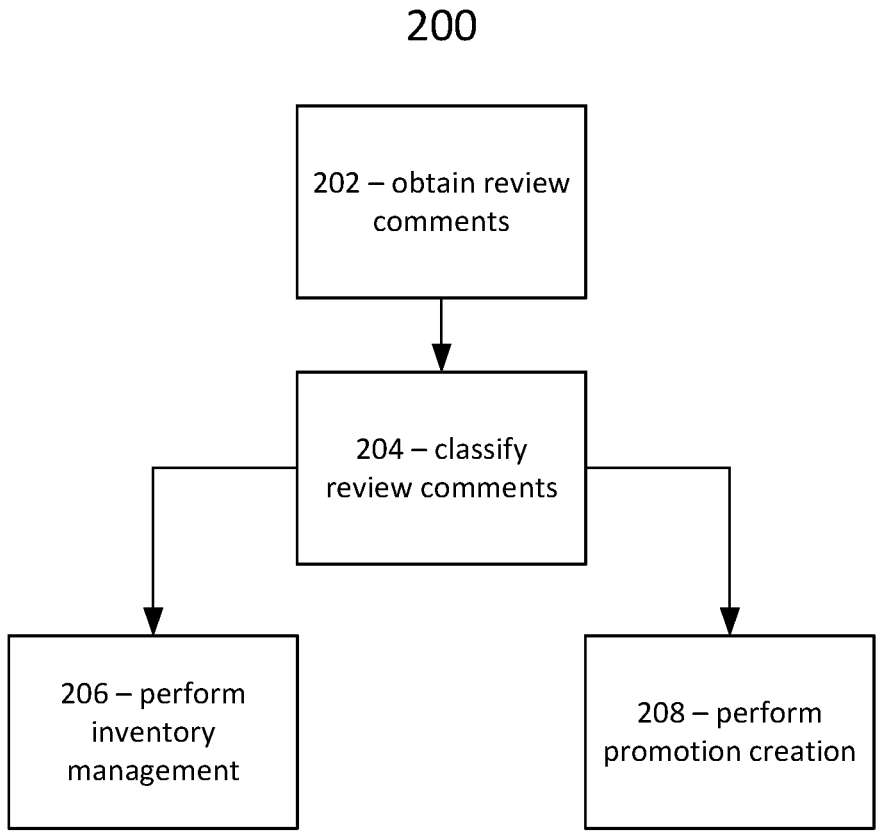
FIG. 2 shows an example customer service integration process according to some embodiments of the disclosure.

FIG. 2 shows an example customer service integration process 200 according to some embodiments of the disclosure. System 100 may perform process 200 to automate and/or manage various customer service tasks such as inventory management and promotion creation, for example.

At 202, integration module 110 and/or review collection module 130 may obtain review comments. For example, review collection module 130 may receive a plurality of review comments from one or more social media platforms 30 and/or other data sources. Publicly available review data sources, including social media platforms 30, are often configured to interface with other systems. For example, review data sources including social media platforms 30 can provide APIs that facilitate communication with systems external to the sources. Review collection module 130 may send instructions customized to respective social media platform 30 (or other source) APIs, for example in the form of a JSON payload or other structure as specified by the source. The instructions may cause social media platform 30 or other source to send review comment data to review collection module 130. Integration module 110 may configure an ELT and/or ETL pipeline into which review collection module 130 may place all review comment data from all sources, forming a single stream of review comment data. The single stream can provide a comprehensive view of customer feedback across platforms, giving a holistic view of product performance across multiple platforms. Review collection module 130 may be configured to send instructions and collect the review comment data at scheduled or otherwise regular times and/or may be triggered to send the instructions and collect the review comment data in response to a command from integration module 110 (e.g., responsive to a user command from client 10), for example.

As a non-limiting example, the following may be a sample JSON structure for a customer review obtained by review collection module 130:

```
{
  "customer_review": {
    "review_id": "1",
    "seller":"emma_jewelery"
    "channel_desc":"Spotify",
    "customer_email": "12345@gmail.com"
    "product_id": "456",
    "product_desc": "Sample Product",
    "timestamp": "2022-01-01T00:00:00",
    "review_text": "Great product! I highly recommend it.",
    "review_rating": 5
  }
}
```

At 204, integration module 110 and/or review collection module 130 may classify review comments received at 202. For example, integration module 110 and/or review collection module 130 may identify at least a subset of the plurality of review comments representing at least one positive review, and/or at least another subset of the plurality of review comments representing at least one negative review, and identify at least one product indicated by the at least one positive review and/or at least one negative review. Classification may be performed at scheduled or otherwise regular times and/or may be triggered in response to a command from integration module 110 (e.g., responsive to a user command from client 10), for example.

In some embodiments, integration module 110 and/or review collection module 130 may classify review comments as positive or negative using a GenAI process. For example, integration module 110 may convert comments in the pipeline described above from a JSON structure to a comma-separated value (CSV) structure. In some embodiments, integration module 110 and/or review collection module 130 may convert the comments to the CSV structure prior to placement into the pipeline. As a non-limiting example, the following may be a sample CSV structure for the example JSON structured review above:

1,emma_jewelery,Spotify,12345@gmail.com,456,
    Sample Product,2022-01-01T00:00:00,"Great product!
    I highly recommend it.",5

In either case, the CSV structured comments may be included in prompts to a GenAI system operated by system 100 and/or accessible to system 100 through a network, API, and/or other communication techniques. The GenAI system may be a generic GenAI system such as ChatGPT (e.g., GPT4) or a specially-trained GenAI system configured to perform sentiment analysis. Integration module 110 and/or review collection module 130 may construct the prompt. A prompt may include a CSV structured comment or at least the text portion thereof (e.g., "Great product! I highly recommend it.") and an instruction to return a sentiment (e.g., positive or negative) indicated by the CSV structured comment. For example, the prompt may direct the GenAI to behave as a model that summarizes and identifies sentiments and/or keywords and to classify a review as negative or positive using consistent return phrases (e.g., one-word answers such as "positive" and "negative").

The following are some non-limiting examples of comments that may be classified as positive:

1. Absolutely stunning! The colors and design are so vibrant and unique.

2. I received countless compliments on the earrings I purchased. They're lightweight and comfortable to wear all day.

3. The necklace is a true work of art. I love how each piece is handmade with such attention to detail.

4. The packaging was lovely, and it made for a perfect gift. My friend adored her new bracelet.

5. I'm so impressed with the quality and craftsmanship of the jewelry. It's a great value for the price.

6. The custom order process was seamless, and the seller was very responsive to my requests. I'm thrilled with my purchase.

7. These pieces are not only beautiful but also durable. I've worn mine multiple times, and they still look as good as new.

The following are some non-limiting examples of comments that may be classified as negative:

1. The colors of the jewelry looked different in person than they did in the pictures online. I was disappointed with my purchase.

2. The earrings I ordered were much heavier than I expected, making them uncomfortable to wear for extended periods.

3. The clasp on my bracelet broke after only a few uses. I expected better quality for the price I paid.

4. My order arrived later than promised, and the seller was not very helpful when I contacted them about the delay.

5. The finish on my necklace started to wear off after just a few weeks, which was disappointing.

6. The sizing of the ring I purchased was off, and I had to pay extra to get it resized.

7. I found the customer service to be lacking. The seller was slow to respond to my questions and concerns.

In some embodiments, the prompt or follow-on prompts from integration module 110 and/or review collection module 130 may direct the GenAI to summarize positive comments, provide aggregations of positive comments, and/or return requested analysis of positive comments (and/or perform any or all of these actions for negative comments), and/or perform other tasks related to the comments. In some embodiments, some or all of these analysis tasks may be performed by integration module 110 and/or review collection module 130 themselves. For example, through a GenAI prompt or locally, in some embodiments integration module 110 and/or review collection module 130 may aggregating at least the subset of the plurality of review comments representing the at least one positive review and identify a number of mentions of the at least one product above a threshold. This can indicate that the at least one product in question is associated with positive sentiment among reviewers. In some embodiments, the GenAI may be prompted to extract the top most trending product or products from among the products reviewed positively.

Integration module 110 can store data obtained and/or generated as described above. For example, system 100 may maintain a data lake, locally and/or remotely, that may include records of comments and output of GenAI processing. Records of comments may include positive comments and/or negative comments. GenAI outputs may include labels and/or classifications of the positive and/or negative comments, summaries of the comments, indications of products mentioned within the comments, trending product information, and/or other information.

After the comments are classified, integration module 110 may trigger inventory management processing at 206 and/or promotion creation processing at 208. In some embodiments, products associated with positive sentiment and/or the top trending product(s) may be reordered through the inventory management processing at 206 and/or promoted through the promotion creation processing at 208. Either or both processes may be performed at scheduled or otherwise regular times and/or may be triggered to send the instructions and collect the review comment data in response to a command from integration module 110 (e.g., responsive to a user command from client 10), for example.

At 206, integration module 110 and/or inventory management module 120 may perform inventory management processing. For example, inventory management processing may include determining, from data produced by inventory system 20, that at least one product (e.g., associated with positive sentiment or top trending) has a low inventory level, generating a message configured to automatically order the at least one product from a supplier system (e.g., from inventory system 20 or another ordering mechanism), and sending the message to the supplier system, thereby automatically ordering the at least one product. Example inventory management processing is described in detail below with respect to FIG. 3.

At 208, integration module 110 and/or promotion creation module 140 may perform promotion creation processing. For example, promotion creation processing may include generating, by a GenAI process, at least one social media template post directed to the at least one product, formatting the at least one social media template post to be transmissible through at least one API of at least one social media platform 30, and sending the formatted at least one social media template post to the at least one social media platform 30 through the at least one API, thereby automatically posting on the at least one social media platform 30. Example promotion creation processing is described in detail below with respect to FIG. 4.

Inventory management and promotion creation are illustrated in process 200, but integration module 110 may be able to use the data generated as described above in additional ways in some embodiments. For example, integration module 110 may provide an interface allowing a user to query and analyze in depth on the review comments. For positive reviews, integration module 110 may prompt the GenAI to automatically generate an email (e.g., weekly or other periodic) newsletter including the top trending products for the time period with highlights of review comments of the products, which may be configured as a short message to post in social media. For positive reviews, integration module 110 may query inventory system 20 to make sure enough items are in stock to generate a targeted marketing campaign for that product. For negative reviews, integration module 110 may prompt the GenAI to generate an automatic email with personalized notes apologizing and on how to resolve the issue, which may be sent to the reviewer. For negative reviews, integration module 110 may prompt the GenAI to identify a supplier for the product and compose an email if the review comments are stating low quality in the product that could be potentially related to poor quality from the supplier. For negative reviews, integration module 110 may prompt the GenAI to connect with inventory system 20 for the product and get insights on when the stock was recently replenished, which may enable proactive steps to improve inventory.

Figure 3:
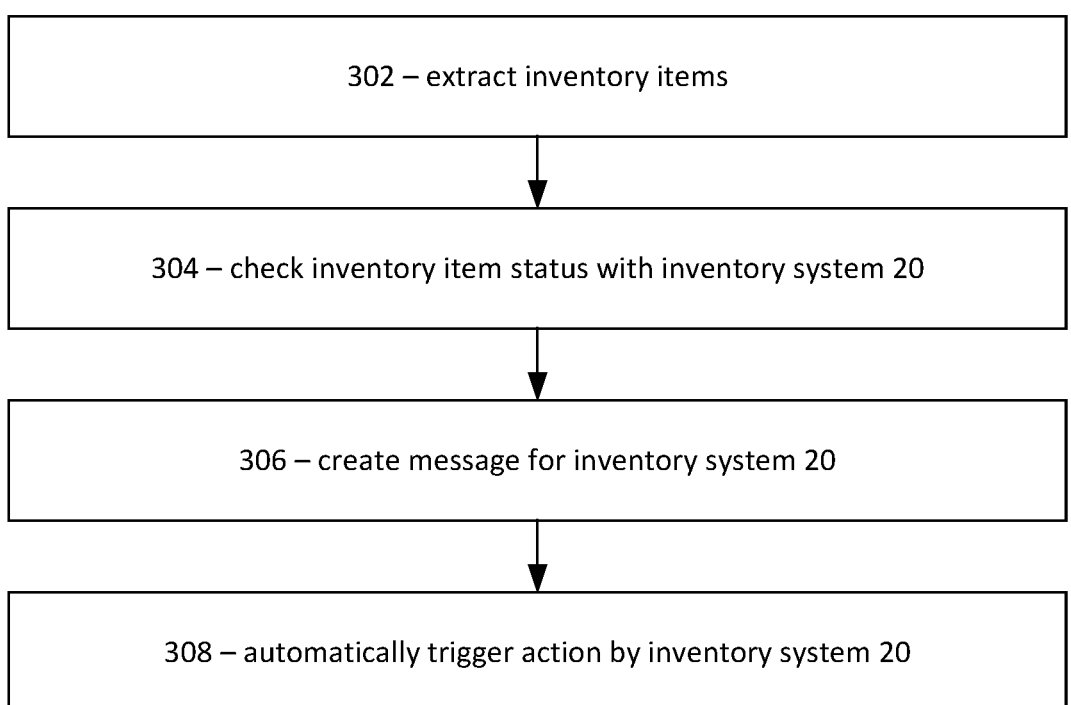
FIG. 3 shows an example inventory management process according to some embodiments of the disclosure.

FIG. 3 shows an example inventory management process 300 according to some embodiments of the disclosure. In at least some embodiments, integration module 110 and/or inventory management module 120 may perform inventory management process 300 as part of process 200 (e.g., at 206). System 100 can manage inventory and coordinate with suppliers based on analysis of product reviews. In at least some embodiments, this may be achieved through machine learning algorithms that analyze reviews to predict inventory demand. This feature may allow businesses to optimize their inventory based on actual customer feedback. System 100 may further integrrate with shipping networks to plan and resolve transportation and logistics issues based on reviews, which may be achieved through API integration and logistics optimization algorithms. This feature may allow businesses to improve their shipping process based on customer feedback. System 100 may automatically place orders and restock items based on positive reviews through predictive analytics and API integration with suppliers. This may allow businesses to optimize their supply chain based on customer feedback.

System 100 can perform process 300 asynchronously (e.g., as a scheduled job) in some embodiments and/or upon user request in some embodiments. In the asynchronous case, system 100 can compare current inventory counts with past inventory levels at which reordering took place, as described below. In the case of a user request, process 300 may be triggered by integration module 110 receiving a user request through a UI from client 10. As a non-limiting example to illustrate the processing involved, such a request may be a question typed into a UI chat bot field such as the following: "Can you verify my on-hand quantity for my trending item {ArtisanMorph Polymer Pendant} before I publish my marketing campaign, I am expecting to sell {75} of them next week and if my on-hand is less, can you compose an order to place for the supplier part?"

At 302, inventory management module 120 can extract inventory items from integration module 110 and/or a memory of system 100. As noted above, integration module 110 can obtain data indicating products that have been reviewed positively. Integration module 110 may maintain this data, for example in the form of a text file, a vector data store, or other data storage. Inventory management module 120 can obtain at least an identification of one or more products that have been reviewed positively for further processing, for example by fetching and reading the text file or vector data or otherwise obtaining the stored data.

At 304, inventory management module 120 can check inventory item status with inventory system 20. For example, inventory management module 120 can create a JSON payload or other message readable by inventory system 20. The JSON payload may identify one or more products obtained at 302 and respective requests to receive an inventory count for each of the one or more products. The specific format of the message may vary according to the requirements of inventory system 20 and/or its API. Inventory management module 120 can query inventory system 20 with this message through the API of inventory system 20 and receive a response from inventory system 20. The response can indicate inventory counts for each of the one or more products. In at least some embodiments, inventory management module 120 can check the returned current inventory counts against previous counts at which inventory was reordered previously and determine whether the current inventory counts are close to the previous counts at which inventory was reordered previously. For example, inventory management module 120 can designate products having counts the same as, or below, the previous counts as ready to reorder. In some cases, inventory management module 120 can designate products having counts above the previous counts, but within some designated distance from the previous counts, as ready to reorder.

At 306, inventory management module 120 can create a message for inventory system 20 that may be configured to trigger an action by inventory system 20. For example, inventory management module 120 can use GenAI to generate a message in some embodiments. Inventory management module 120 can prompt the GenAI to write a JSON payload to order one or more products. In some embodiments, inventory management module 120 can proceed to 306 automatically after generating the payload. In some embodiments, integration module 110 can present the order to the user through a UI displayed at client 10 and receive user approval before proceeding. For example, in a case where the order is responsive to the user request described above, integration module 110 may respond as follows in the UI chat bot window: "Based on the provided data, the on-hand quantity for ArtisanMorph Polymer Pendants (ID: 110) is 48. Since you are expecting to sell 75 of them next week, you will need to order an additional 27 units to meet the demand."

A non-limiting example JSON payload that may be used to order 27 units may read as follows:

```
{
    "order": {
        "supplier_part_id": "AM-2223",
        "description": "ArtisanMorph Polymer Pendants",
        "quantity": 27,
        "supplier_email": "supplier10@example.com",
        "supplier_address": "2223 Artisan Rd, Jewelry City, 12345",
        "supplier_phone": "+1 (012) 123-4567",
        "delivery_days": 3
    }
}
```

Integration module 110 may request user approval (e.g., displaying in the UI chatbot a message such as "Please review the order details and proceed with placing the order to ensure you have enough stock for your marketing campaign.") and receive user approval (e.g., a response asking system 100 to proceed with the order).

At 308, inventory management module 120 can automatically trigger action by inventory system 20. For example, inventory management module 120 can send the JSON payload generated at 306 to inventory system 20 using the API of inventory system 20. Inventory system 20 can receive the order in the JSON payload and fulfill the order. Accordingly, process 300 can fully automate inventory reordering for popular products and/or streamline user-driven reordering of popular products without requiring any technical input or manual coding from the user.

Figure 4:
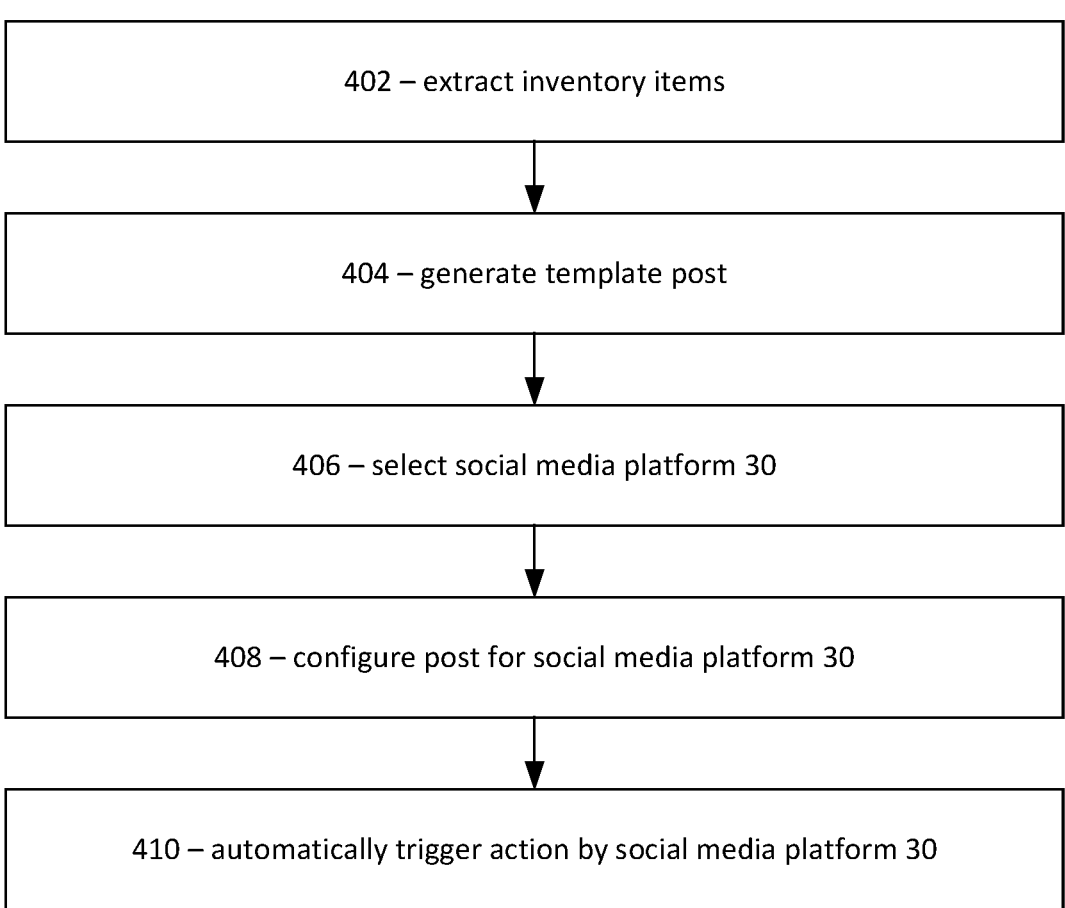
FIG. 4 shows an example promotion creation process according to some embodiments of the disclosure.

FIG. 4 shows an example promotion creation process 400 according to some embodiments of the disclosure. In at least some embodiments, integration module 110 and/or promotion creation module 140 may perform promotion creation process 400 as part of process 200 (e.g., at 208). System 100 can use positive review data to automatically create and promote products on social media platforms 30, which may include using photos and/or generating videos. System 100 can use GenAI and NLP techniques that extract positive sentiments from reviews and API integration that posts promotional content on social media platforms 30. Accordingly, system 100 may automatically leverage customer feedback for marketing and interacting with social media platforms 30 without user coding or configuration.

At 402, promotion creation module 140 can extract inventory items from integration module 110 and/or a memory of system 100. As noted above, integration module 110 can obtain data indicating products that have been reviewed positively. Integration module 110 may maintain this data, for example in the form of a text file, a vector data store, or other data storage. Promotion creation module 140 can obtain at least an identification of one or more products that have been reviewed positively for further processing, for example by fetching and reading the text file or vector data or otherwise obtaining the stored data.

At 404, promotion creation module 140 can generate a template post. For example, promotion creation module 140 can send a prompt to the GenAI instructing the GenAI to prepare a sample post including an image of a product indicated at 402 and/or promotional copy related to the product. The GenAI may return a template post.

At 406, promotion creation module 140 can select at least one social media platform 30 and/or other channel(s) for posting. For example, promotion creation module 140 can provide the sample post to a user through integration module 110 and the UI driven by integration module 110 and viewed using client 10. The user may be able to select one or more channels through which the post should be shared.

At 408, promotion creation module 140 can configure the post for the social media platform(s) 30 selected at 406. For example, promotion creation module 140 can send a prompt to the GenAI instructing the GenAI to prepare a post based on the template post, or including same prompt information as that used to generate the template post, but for the selected social media platform(s) 30 and/or other channel(s). The prompt may indicate a specific social media platform 30 or channel and/or may include a set of formatting parameters tailored to the specific social media platform 30 or channel. As a few non-limiting examples, promotion creation module 140 can create prompts for email newsletters, Instagram, and/or Facebook, among others. In some embodiments, promotion creation module 140 can provide the generated post to a user through integration module 110 and the UI driven by integration module 110 and viewed using client 10. The user may be able to approve and/or modify the post prior to sharing. As a few non-limiting examples, the following may be an example email newsletter post:

Subject: "Unleash Your Inner Artist with Our Trending ArtisanMorph Polymer

Pendant!"

Body:

"Hello, [Customer's Name]!

We have exciting news! Our ArtisanMorph Polymer Pendant has become this week's top trending item, and we're celebrating with a limited-time offer just for you! Experience the beauty and craftsmanship that has wowed our customers and garnered rave reviews.

Use code: ARTMAGIC to get a 15% discount on your ArtisanMorph Polymer

Pendant purchase!

Why You'll Love the ArtisanMorph Pendant:

Stunning design: Elevate your style with this unique, handcrafted pendant.

Impressive durability: Enjoy a piece that looks as beautiful as the day you received it.

Countless compliments: Be prepared to receive praise from friends and family alike.

Hurry! This offer expires in 48 hours. Don't miss out on the chance to own this beautiful and trendy piece.

Shop now: [Link to Purchase]

Warm regards,

[Your Brand Name]"

The following may be an example Instagram post:

(Post a captivating image of the ArtisanMorph Polymer Pendant, showcasing its intricate design and beautiful colors.) Caption:

"Meet our top-trending ArtisanMorph Polymer Pendant! This artistic masterpiece has been stealing hearts with its unique design and lasting beauty. Use code ARTMAGIC for a 15% discount, but hurry—offer ends in 48 hours! Shop now —[Link in Bio]#ArtisanMorphPendant #HandcraftedJewelry #TrendingNow"

The following may be an example Facebook post:

(Post an eye-catching image of the ArtisanMorph Polymer Pendant, along with a testimonial from a satisfied customer.)

Caption:

"Our ArtisanMorph Polymer Pendant is taking the spotlight as our top trending item this week! Discover the stunning craftsmanship that has customers raving. Enjoy a special 15% discount with code ARTMAGIC, but act fast—this offer expires in 48 hours. Don't miss your chance to own this beautiful piece! Shop now: [Link to Purchase]#ArtisanMorphPendant #TrendingJewelry #LimitedTimeOffer"

At 410, promotion creation module 140 can automatically trigger action by the selected social media platform(s) 30. For example, promotion creation module 140 can send the post data generated at 408 to social media platform(s) 30 using the API(s) of social media platform(s) 30. Social media platform(s) 30 can receive the post data and publish the post. Accordingly, process 400 can fully automate social media advertising and/or messaging for popular products and/or streamline user-driven social media advertising and/or messaging for popular products without requiring any technical input or manual coding from the user.

Figure 5:
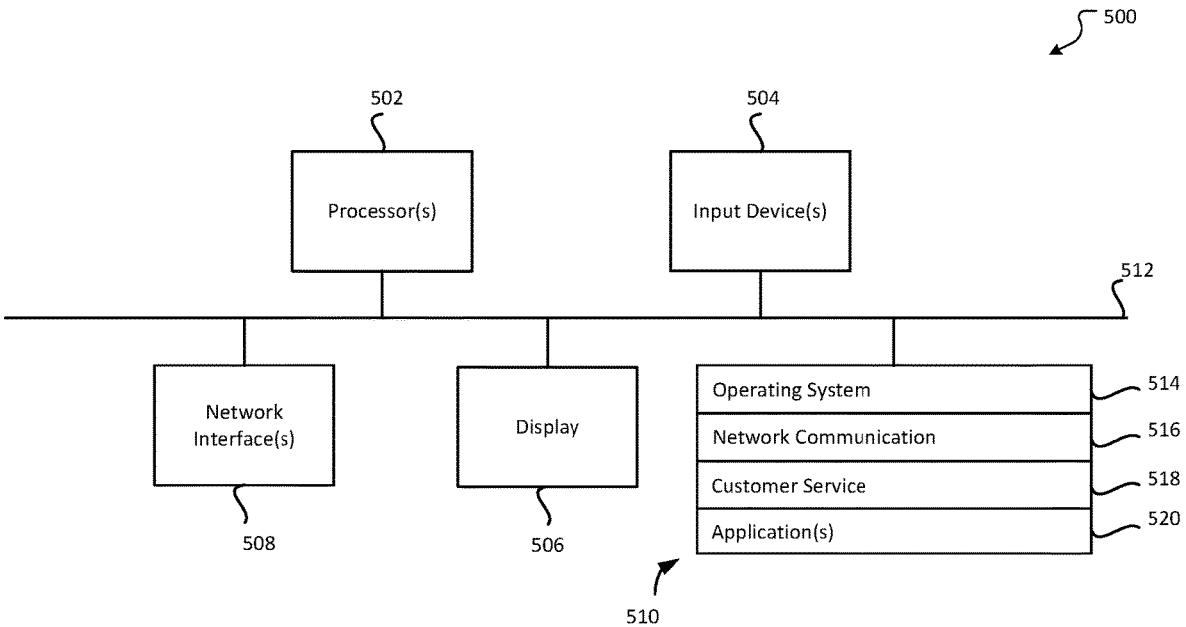
FIG. 5 shows an example computing device according to some embodiments of the disclosure.

FIG. 5 shows a computing device 500 according to some embodiments of the disclosure. For example, computing device 500 may function as system 100 and/or any portion(s) thereof, or multiple computing devices 500 may function as system 100 and/or any portion(s) thereof.

Computing device 500 may be implemented on any electronic device that runs software applications derived from compiled instructions, including without limitation personal computers, servers, smart phones, media players, electronic tablets, game consoles, email devices, etc. In some implementations, computing device 500 may include one or more processors 502, one or more input devices 504, one or more display devices 506, one or more network interfaces 508, and one or more computer-readable mediums 510. Each of these components may be coupled by bus 512, and in some embodiments, these components may be distributed among multiple physical locations and coupled by a network.

Display device 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device 504 may be any known input device technology, including but not limited to a keyboard (including a virtual keyboard), mouse, track ball, and touch-sensitive pad or display. Bus 512 may be any known internal or external bus technology, including but not limited to ISA, EISA, PCI, PCI Express, NuBus, USB, Serial ATA or FireWire. In some embodiments, some or all devices shown as coupled by bus 512 may not be coupled to one another by a physical bus, but by a network connection, for example. Computer-readable medium 510 may be any medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 510 may include various instructions 514 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 may establish and maintain network connections (e.g., software for implementing communication protocols, such as TCP/IP, HTTP, Ethernet, telephony, etc.).

Customer service component(s) 518 may include instructions for performing the processing described herein. For example, customer service component(s) 518 may provide instructions for performing any and/or all of processes 200, 300, and/or 400, and/or other processing as described above. Application(s) 520 may be an application that uses or implements the outcome of processes described herein and/or other processes. In some embodiments, the various processes may also be implemented in operating system 514.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
receiving, by at least one processor, a plurality of review comments;
identifying, by the at least one processor, at least a subset of the plurality of review comments representing at least one positive review;
identifying, by the at least one processor, at least one product indicated by the at least one positive review;
determining, by the at least one processor from data produced by an inventory system, that the at least one product has a low inventory level;
in response to the determining, generating, by the at least one processor, a message configured to automatically order the at least one product from a supplier system, the generating comprising:
in response to the determining, generating an automatically configured order prompt including data indicative of the at least one product and indicative of a data structure required by the supplier system,
inputting the automatically configured order prompt to a generative artificial intelligence (GenAI) system, and
receiving the message from the GenAI system, the message including an order command having the data structure required by the supplier system;
sending, by the at least one processor, the message to the supplier system, thereby automatically ordering the at least one product;
generating, by the at least one processor, at least one social media template post directed to the at least one product, the generating comprising:
in response to the identifying the at least one product, generating a first automatically configured prompt including data indicative of the at least one product and first predefined instructions inputting the first automatically configured prompt to the GenAI system, and
receiving the at least one social media template post from the GenAI system;
formatting, by the at least one processor, the at least one social media template post to be transmissible through at least one application programming interface (API) of at least one social media platform, the formatting comprising:
receiving a selection of the at least one social media platform,
identifying second predefined instructions defining at least one parameter applicable to the at least one social media platform,
generating a second automatically configured prompt including or referencing the at least one social media template post and including the second predefined instructions,
inputting the second automatically configured prompt to the GenAI system, and
receiving at least one formatted social media post from the GenAI system, the at least one formatted social media post comprising instructions executable by the at least one social media platform and transmissible through the at least one API; and
sending, by the at least one processor, the at least one formatted social media post to the at least one social media platform through the at least one API, thereby automatically posting on the at least one social media platform.

2. The method of claim 1, wherein the identifying of the at least the subset of the plurality of review comments representing the at least one positive review is performed using the GenAI system.

3. The method of claim 1, wherein the identifying of the at least one product comprises aggregating the at least the subset of the plurality of review comments representing the at least one positive review and identifying a number of mentions of the at least one product above a threshold.

4. The method of claim 1, wherein the determining comprises asynchronously querying the inventory system.

5. The method of claim 1, wherein the message comprises a JavaScript Object Notation (JSON) payload.

6. A method comprising:
receiving, by at least one processor, a plurality of review comments;
identifying, by the at least one processor, at least a subset of the plurality of review comments representing at least one positive review;
identifying, by the at least one processor, at least one product indicated by the at least one positive review;
generating, by the at least one processor, at least one social media template post directed to the at least one product, the generating comprising:
in response to the identifying the at least one product, generating a first automatically configured prompt including data indicative of the at least one product and first predefined instructions,
inputting the first automatically configured prompt to a generative artificial intelligence (GenAI) system, and
receiving the at least one social media template post from the GenAI system;
formatting, by the at least one processor, the at least one social media template post to be transmissible through at least one application programming interface (API) of at least one social media platform, the formatting comprising:

receiving a selection of the at least one social media platform, identifying second predefined instructions defining at least one parameter applicable to the at least one social media platform, generating a second automatically configured prompt including or referencing the at least one social media template post and including the second predefined instructions, inputting the second automatically configured prompt to the GenAI system, and receiving at least one formatted social media post from the GenAI system, the at least one formatted social media post comprising instructions executable by the at least one social media platform and transmissible through the at least one API; and sending, by the at least one processor, the at least one formatted social media post to the at least one social media platform through the at least one API, thereby automatically posting on the at least one social media platform.

7. The method of claim 6, wherein the identifying of the at least the subset of the plurality of review comments representing the at least one positive review is performed using the GenAI system.

8. The method of claim 6, wherein the identifying of the at least one product comprises aggregating the at least the subset of the plurality of review comments representing the at least one positive review and identifying a number of mentions of the at least one product above a threshold.

9. A system comprising:

at least one processor; and at least one non-transitory computer readable medium storing instructions that, when executed by the at least one processor, cause the at least one processor to perform processing comprising:

receiving a plurality of review comments;

identifying at least a subset of the plurality of review comments representing at least one positive review;

identifying at least one product indicated by the at least one positive review;

determining, from data produced by an inventory system, that the at least one product has a low inventory level;

in response to the determining, generating a message configured to automatically order the at least one product from a supplier system, the generating comprising:

in response to the determining, generating an automatically configured order prompt including data indicative of the at least one product and indicative of a data structure required by the supplier system, inputting the automatically configured order prompt to a generative artificial intelligence (GenAI) system, and receiving the message from the GenAI system, the message including an order command having the data structure required by the supplier system;

sending the message to the supplier system, thereby automatically ordering the at least one product;

generating at least one social media template post directed to the at least one product, the generating comprising:

in response to the identifying the at least one product, generating a first automatically configured prompt including data indicative of the at least one product and first predefined instructions, inputting the first automatically configured prompt to the GenAI system, and receiving the at least one social media template post from the GenAI system;

formatting the at least one social media template post to be transmissible through at least one application programming interface (API) of at least one social media platform, the formatting comprising:

receiving a selection of the at least one social media platform, identifying second predefined instructions defining at least one parameter applicable to the at least one social media platform, generating a second automatically configured prompt including or referencing the at least one social media template post and including the second predefined instructions, inputting the second automatically configured prompt to the GenAI system, and receiving at least one formatted social media post from the GenAI system, the at least one formatted social media post comprising instructions executable by the at least one social media platform and transmissible through the at least one API; and sending the at least one formatted social media post to the at least one social media platform through the at least one API, thereby automatically posting on the at least one social media platform.

10. The system of claim 9, wherein the identifying of the at least the subset of the plurality of review comments representing the at least one positive review is performed using the GenAI system.

11. The system of claim 9, wherein the identifying of the at least one product comprises aggregating the at least the subset of the plurality of review comments representing the at least one positive review and identifying a number of mentions of the at least one product above a threshold.

12. The system of claim 9, wherein the determining comprises asynchronously querying the inventory system.

13. The system of claim 9, wherein the message comprises a JavaScript Object Notation (JSON) payload.

* * * * *